United States Patent [19]
Anderson

[11] 3,971,602
[45] July 27, 1976

[54] THRUST BEARING

[75] Inventor: William J. Anderson, North Olmsted, Ohio

[73] Assignee: The United States of America as represented by the Administrator of the National Aeronautics and Space Administration, Washington, D.C.

[22] Filed: June 25, 1975

[21] Appl. No.: 590,182

[52] U.S. Cl. ............................... 308/160; 308/163; 308/170
[51] Int. Cl.[2] .......................................... F16C 17/06
[58] Field of Search ........... 308/139, 160, 162, 163, 308/168, 170, 134.1, 122

[56] References Cited
UNITED STATES PATENTS

| | | | |
|---|---|---|---|
| 1,664,878 | 4/1928 | Flintermann | 308/160 |
| 1,767,238 | 6/1930 | Howarth | 308/160 |
| 3,378,319 | 4/1968 | Cutting et al. | 308/160 |
| 3,677,612 | 7/1972 | Barnett et al. | 308/168 |

Primary Examiner—M. H. Wood, Jr.
Assistant Examiner—Gene A. Church
Attorney, Agent, or Firm—N. T. Musial; G. E. Shook; John R. Manning

[57] ABSTRACT

A gas-lubricated thrust bearing employs relatively rigid inwardly cantilevered spokes carrying a relatively resilient annular member or annulus. This annulus acts as a beam on which are mounted bearing pads. The resilience of the beam mount causes the pads to accept the load and, with proper design, responds to a rotating thrust-transmitting collar by creating a gas film between the pads and the thrust collar. The bearing may be arranged for load equalization thereby avoiding the necessity of gimbal mounts or the like for the bearing. It may also be arranged to respond to rotation in one or both directions.

7 Claims, 10 Drawing Figures

THRUST BEARING

The invention described herein was made by an employee of the United States Government and may be manufactured and used by or for the Government for governmental purposes without the payment of any royalties thereon or therefor.

BACKGROUND OF THE INVENTION

Thrust bearings employing pads against which a rotating thrust ring acts are known. Such bearings with rigid geometry members or pads forming a load carrying film with rigid mountings are known. These bearings are sensitive to contaminating particles carried by the gas. A second type employs rigid geometry members or pads to form a load carrying film with compliant mountings. To date these use elastomeric materials in a compliant mounting. Such materials are severely temperature limited, and do not have adequate stiffness for machines with close tolerance impellers in which axial movement of the rotor must be limited. They are not as sensitive to contaminating particles as the first type. A third type use foil arrangements. These can be started and stopped without external pressurization and are still less sensitive to contaminating particles. Nevertheless, these have limited stiffness. Attempts to increase stiffness have until now led to problems with starting torque and power loss.

OBJECTS OF THE INVENTION

It is an object of the invention to provide an improved gas trust bearing.

It is another object of the invention to provide a gas thrust bearing of the type using bearing pads which are less sensitive to contaminating particles than prior pad bearing gas thrust bearings.

SUMMARY OF THE INVENTION

A gas-lubricated thrust bearing assembly of the invention employs inwardly cantilevered, relatively rigid beams or spokes carrying a relatively resilient heat resistant annular member. On the resilient member are mounted rigid thrust bearing pads. The pads are located on the annulus circumferentially between the spokes, so that under load the pads yield due to the resilience of the annulus. Hence, the annulus acts as a resilient beam bearing each pad between a pair of spokes. Under selected mounting arrangement, the pads may equalize the load among themselves, avoiding the necessity for gimbals or the like for load equalization. As will appear hereinafter, the bearing may be designed for bidirectional rotation of the bearing rotor.

Other objects and advantages of the invention will be apparent from a reading of the specification in connection with the accompanying drawings.

DETAILED DESCRIPTION

Figure 1:
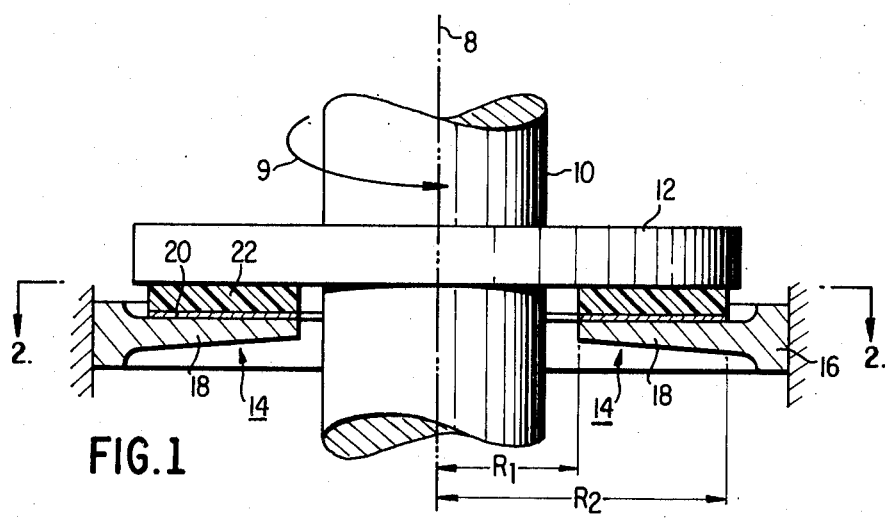
FIG. 1 is a longitudinal sectional view through a bearing embodying the invention.

With reference to FIG. 1, a shaft 10 rotatable about an axis 8 in the direction indicated by arrow 9, carries a thrust collar 12. The longitudinal thrust of the rotating shaft 10 is to be received and borne by the thrust bearing 14. The bearing 14 comprises in annular form a ring 16 which may be gimbal mounted or, as illustrated by the usual convention, fastened directly to the machine frame. The ring 16 carries six inwardly cantilievered members or spokes 18 spaced circumferentially angularly equally. On the spokes 18 is mounted a resilient metallic heat resistant annulus 20 (rather than elastomeric) which serves between adjacent pairs of spokes as a beam. The annulus 20 is resilient relative to the spokes 18 which are stiffer than the annulus 20. On the annulus 20 are mounted six rigid, sectoral shaped pads 22 spaced equally circumferentially between the spokes 18 as viewed in FIG. 2, but the spacing $b$ from spoke center-line to adjacent pad circumferentially in the direction of shaft rotation (counter-clockwise) is greater than the distance from the same pad to the succeeding spoke center-line in the same direction. In other words, the leading edge of pad 22 is more remote (distance $b$) from its adjacent beam 18 than the lagging edge of pad 22 (distance $a$) from its adjacent beam 18. The number of cantilevered beams and pads are exemplary only and may be selected depending upon the bearing size, load requirements and other design factors.

Figure 3:
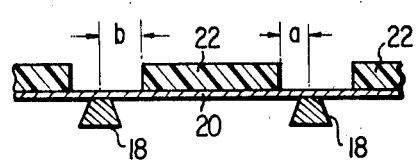
FIG. 3 is a partial cross-sectional view along the lines 3—3 of FIG. 2.

Referring to FIG. 3, it will be apparent that adjacent spokes 18 serve as supports between which the resilient annulus 20 serves as a beam to carry each pad 22. The axial stiffness of the resilient beam or annulus 20 is a function of the beam dimensions between each set of spokes 18. The angular stiffness considering the load pad 22 to be infinitely stiff in bending relative to the resilient beam 20 is a function of the ratio of $b$, the distance of the leading edge of the pad 22 from the center of its adjacent spoke 18, to $a$, the distance of the lagging edge of the pad 22 from the center of its adjacent spoke. It also will be a function of the thickness of the resilient annulus 20, of the difference $R2 - R1$, the radial dimension of the spoke 18 and the distance center to center of adjacent spokes 18. The resilient beam 20 may be designed to produce during operation near optimum pad inclination in the circumferential direction, i.e., the maximum gas film thickness, for any value of unit pad loading and velocity of rotation.

For a uniform thickness resilient beam or annulus 20 the leading and trailing edges of each load pad should be in radial directions. This would make the resilient beam support less stiff at R2 than at R1 resulting in a divergent film in the direction of increasing radius, and reduced load capacity. The thickness t of the resilient beam can be made thicker at R2 than at R1 or the leading and trailing edges of each pad can be directed so that deflections at R1 will be equal to or greater than those at R2. A slightly convergent film in the direction of increasing radius would then result. This is desirable for greater load capacity.

Figure 4:
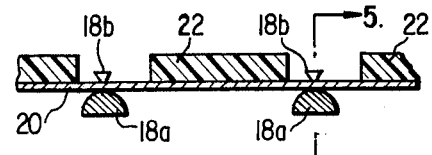
FIG. 4 is a partial sectional view of an embodiment of the invention designed for self-equalization of the thrust load against a plurality of pads.
Figure 5:
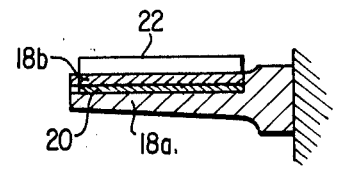
FIG. 5 is a partial cross-sectional view along the lines 5—5 of FIG. 4.

In FIG. 3, the resilient beam 20 is illustrated as rigidly mounted to a flat surface on each radial spoke 18. In this design, the load will tend not to be self-equalized among the different pads 22. The reason is that the constraint of the mounting to the spokes 18 constrains the annulus 20 at that point to have a zero slope relative to the axis, i.e., to remain at each spoke in a plane substantially normal to the axis. FIGS. 4 and 5 illustrate a somewhat different embodiment, in other respects similar to that of FIG. 1, except for the attachment of the spokes 18 to the annulus 20. In the embodiment of FIGS. 4 and 5, the loads among the various pads 22 will tend to be self-equalized. The spokes 18a, corresponding to the spokes 18 of FIG. 1, are shaped to provide the effect of a fulcrum edge at their junctions with the annulus 20.

Moreover, thickening members or bars 18b may be provided on the side of annulus 20 opposite the spokes 18 to enhance the attachment, and also the fulcrum junction. The arrangement is such that there is little constraint on the annulus 20 to remain at the junction in a plane normal to the axis 8. In other words, the resilient beam 20 at the spokes 18a is free to pivot slightly along the idealized edge of each spoke.

Figure 1A:
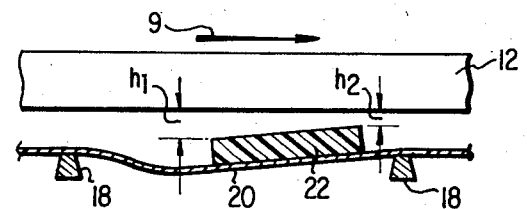
FIG. 1a is a partial sectional view useful in describing the operation of the embodiment of FIG. 1.
Figure 2:
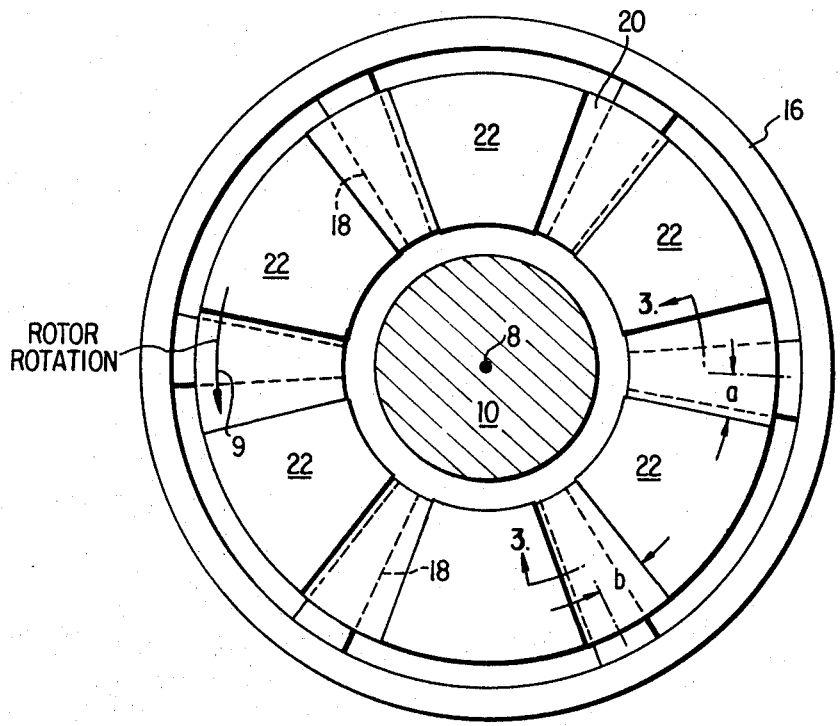
FIG. 2 is a cross-sectional view along the lines 2—2 of FIG. 1.
Figure 4A:
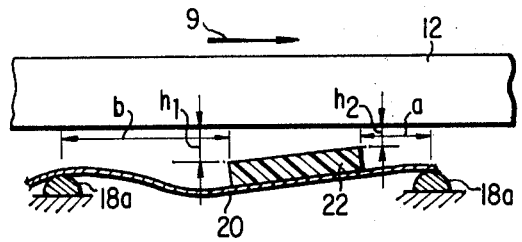
FIG. 4a is a partial sectional view useful in describing the operation of the embodiment of FIG. 4.

The operation of and the distinction between the embodiment of FIGS. 1 through 3 and that of FIGS. 4 and 5 will be apparent from the drawings of FIGS. 1a and 4a. In these drawings, the representations bear reference numerals corresponding to the parts as numbered in the drawings.

In the embodiment of FIG. 1 as illustrated in FIG. 1a, as the collar 12 approaches speed in the rotation direction 9, the ambient gas, which may be air, is entrapped between the collar 12 and the pads 22. As the air is drawn between the pad 22 and the collar 12, the resilient annulus is shaped somewhat as shown (but much exaggerated), constrained at the connection to the spokes 18 to be in a plane normal to the axis of rotation.

In the embodiment of FIG. 4 as illustrated in FIG. 4a, the constraint is positional only. The annulus may have a slope relative to a plane normal to the axis. In both embodiments nevertheless the pad assumes a non-zero angle relative to a plane normal to the axis. The entrapped air creates the air bearing, the pad assuming at its leading edge (the edge approached first by a point on the shaft 10) a spacing $h_1$ from the collar, and at its lagging edge (the edge approached circumferentially later by the same point on the shaft 10 as it continues to rotate) a spacing $h_2$.

For a mathematical analysis and a discussion of the results achieved by the bearings of FIGS. 1 and 4 and tabular values for various parameters, reference may be made to NASA Technical Note TN D-7724, entitled Analysis of an All-Metallic Resilient-Pad Gas-Lubricated Thrust Bearing.

The embodiment of FIG. 4, because of the lesser constraint at the attachments of the annulus 20 to the beams 18, tends to equalize the bearing forces absorbed by the pads 22. Hence an arrangement such as that of FIG. 4 or other arrangement in which the attachments of the annulus 20 to the spokes 18 does not constrain the annulus to remain parallel to a plane normal to the axis 8 is preferred. Consequently, the use of gimbals or the like in mounting the bearing assembly may be avoided.

Figure 6:
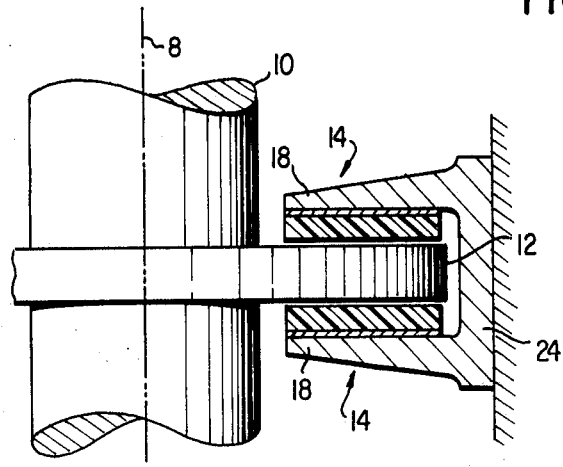
FIG. 6 is a partial longitudinal cross-sectional view of an embodiment of the invention arranged for bidirectional thrust loading.

FIG. 6 illustrates a configuration for supporting the thrust load in either axial direction. There are two sets of pad resilient beam assemblies 14, each mounted to a set of radial spokes 18. The two sets of spokes 18 are joined to a ring 24 which may be gimbal mounted or, as indicated, rigidly mounted to the machine frame. The collar 12 naturally must be designed to act in either axial direction.

Figure 7A:
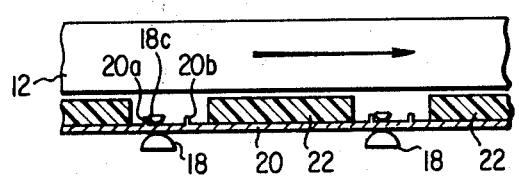
FIG. 7 is a schematic, partial cross-sectional view of still another embodiment of the invention, illustrating in FIG. 7a the result of rotation in one direction and in FIG. 7b the result of rotation in the reverse direction.
Figure 7B:
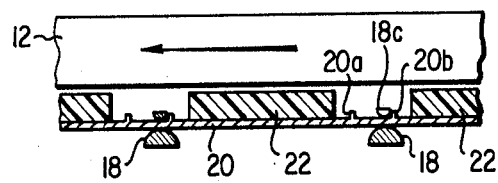

In FIG. 7 is illustrated a configuration for supporting the thrust load to accept a rotor rotation in either direction. FIG. 7a illustrates rotation of the thrust collar 12 in one (arbitrarily termed a primary) direction indicated by an arrow. In FIG. 7b, the reverse direction of rotation is indicated by an oppositely directed arrow. On the annulus 20 are fastened stops 20a and 20b. Each pair of stops 20a and 20b are located adjacent the space between a pair of pads 22 and each stop equally distant from the adjacent pad. Secondary spokes 18c are arranged in opposition to the spokes 18, whereby when the rotor rotates in one direction, the stops 20a reach the secondary spokes 18c to halt the thrust bearing and at the same time locate the pads 22 so that the leading edge of the pad is more remote from its nearest spoke 18 than the lagging edge from its spoke 18. Accordingly, if the stops are spaced correctly, the pads 22 will assume an angular disposition to provide the desired spacing and gas bearing.

The action of the bearing when the rotor is stopped and reversed is such that the initial pad position is not correct and no load capacity can be developed because the ratio b to a corresponding to the ratio described in FIG. 1 is opposite what it should be. The frictional torque applied to the pad by the rotor causes the pad assembly on the bearing 20 to rotate until the stops 20b contact the spokes 18c, the two sets of stops being appropriately positioned so that the ratio is optimum for the load in either the primary or reverse directions. The proper functioning of the bidirectional rotation depends on frictional restraint between the resilient beams and the radial spokes being less than that between the rotor and pad when reverse rotation begins. This is necessary so that the rotor can force the pad and beam assembly to slide in its contacts with spokes 18 and 18c until the reverse stops 20b contact the spokes. In FIG. 7 is illustrated simple sliding joints between the resilient annulus 20 and the spokes 18 and 18c. Small diameter rollers could be incorporated into the spokes to bear against the resilient beam or annulus 20 to reduce friction in the circumferential direction. The bidirectional rotation configuration of FIG. 7 may easily be combined with the bidirectional thrust load configuration of FIG. 6 to produce a thrust bearing which may carry the thrust load in both axial directions for rotor rotation in either direction.

The theory relating to the resilient pad gas thrust bearing described herein is more fully developed in a NASA Technical Note identified as NASA TN D-7724 entitled Analysis of an All-Metallic Resilient-Pad Gas-Lubricated Thrust Bearing by William J. Anderson, Lewis Research Center, Cleveland, Ohio 44135.

What is claimed is:

1. A thrust bearing assembly arranged to cooperate with a rotor which rotates in at least one angular direction, comprising,
   a mount in annular form, spokes cantilevered radially inward from said annular form, the cantilevered spokes being arranged at equal angular intervals about the axis of said mount and the coincident axes of said rotor, a heat resistant annulus resilient relative to and supported by said cantilevered spokes against axial thrust, thereby forming flexible beams between adjacent pairs of said cantilevered spokes, and thrust pads supported on said resilient beams to receive the thrust of said bearing, said pads being also spaced at like equal intervals angularly between said spoke, the leading edge of each pad being farther circumferentially from its adjacent spoke than the lagging edge of said pad circumferentially from its adjacent spoke.

2. The bearing assembly as claimed in claim 1 in which said pads are relatively rigid.

3. The bearing assembly as claimed in claim 1, said heat resistant annulus being metallic.

4. The bearing assembly as claimed in claim 3, each of the said spokes supporting said annulus against a flat spoke surface, said spokes being attached to the annulus to constrain the annulus along the lines of attachment to remain in a plane normal to the annulus axis.

5. The bearing assembly as claimed in claim 3, each of the said spokes supporting said annulus against a spoke by an attachment functioning as a fulcrum along the line of attachment of spoke and annulus.

6. The bearing assembly as claimed in claim 3, further comprising a frame, an annulus rotatable about its axis relative to said frame, and cooperating stops, some on said annulus and at least one fixed with respect to the frame, whereby the rotation of said annulus is limited in both directions of rotation.

7. A thrust bearing comprising a bidirectional shaft, a thrust collar having axially bidirectional thrust surfaces carried by said collar, and a pair of bearing assemblies, a different one for each of said thrust surfaces, each bearing assembly comprising a mount in annular form and relatively rigid spokes cantilevered radially inward from said annular form, the cantilevered spokes being arranged at equal angular intervals about the axis of said mount and the coincident axis of said shaft, a metallic annulus resilient relative to said spokes against axial thrust, thereby forming flexible beams between said cantilevered spokes, and rigid thrust pads supported on said beams to receive the thrust of said bearing, said pads being also spaced at like equal intervals angularly between said spokes, the leading edge of each pad being farther circumferentially from its adjacent spoke than the lagging edges of said pad circumferentially from its adjacent spoke, said bearing assemblies being faced oppositely to receive opposite thrusts from said collar.

* * * * *